Dec. 12, 1950  C. R. HARRIS  2,533,581
HYDROGEN PEROXIDE BY THE PARTIAL
OXIDATION OF HYDROCARBONS
Filed April 19, 1946
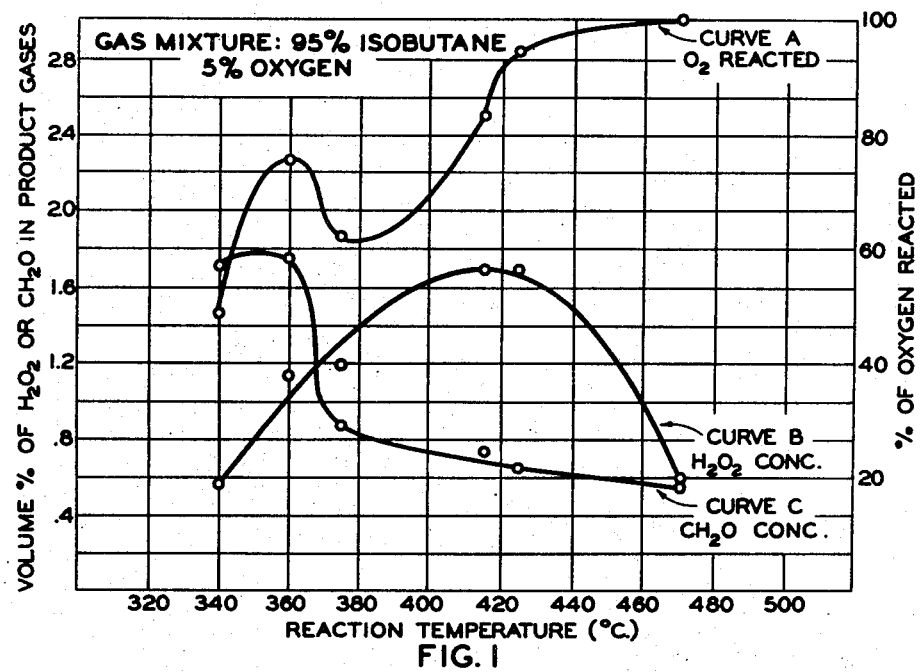
FIG. I
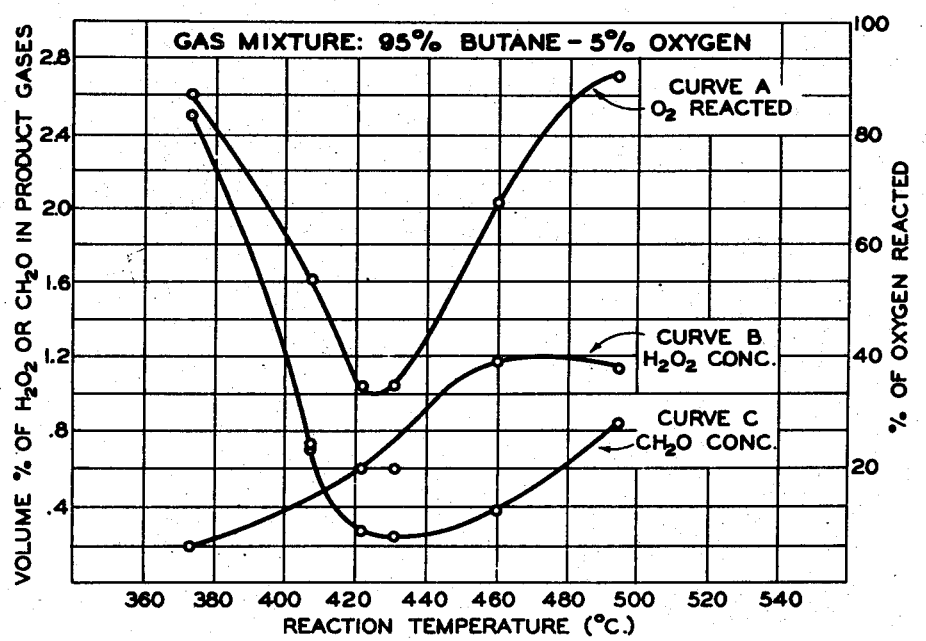
FIG. 2
INVENTOR.
CHARLES R. HARRIS
BY *Amos D. Cole*
AGENT Patented Dec. 12, 1950

2,533,581

UNITED STATES PATENT OFFICE 2,533,581

HYDROGEN PEROXIDE BY THE PARTIAL OXIDATION OF HYDROCARBONS

Charles R. Harris, Lockport, N. Y., assignor to E. I. du Pont de Nemours & Company, Wilmington, Del., a corporation of Delaware Application April 19, 1946, Serial No. 663,606

10 Claims. (Cl. 23—207)

This invention relates to the oxidation of hydrocarbons and more particularly to a method for the production of hydrogen peroxide by the partial oxidation of certain saturated hydrocarbons.

The prior art discloses the production of alcohols, aldehydes and the like products by the partial oxidation of various aliphatic hydrocarbons and Pease and Munro, J. A. C. S. 56, 2034–2038, disclose the production of an organic peroxide along with other products by the non-explosive partial oxidation of propane with oxygen at certain temperatures. It is also known as disclosed in Lacomble U. S. Patent 2,376,257 that when propane and other saturated hydrocarbons are subjected to partial oxidation under specific conditions, hydrogen peroxide is produced as the predominant peroxygen product.

It is an object of the present invention to provide an improved method of producing hydrogen peroxide by the partial oxidation of certain saturated hydrocarbons. A further object is the provision of an improved method of effecting the partial oxidation of such hydrocarbons, whereby hydrogen peroxide is obtained in improved yields and the proportion of aldehyde by-products, simultaneously produced, is lower than possible by methods heretofore known. The above and still further objects will be apparent from the ensuing description of the invention.

It has been previously known that the production of hydrogen peroxide by the partial oxidation of saturated aliphatic hydrocarbons is favored when the oxidation is carried out employing certain proportions of the hydrocarbon to oxygen. It has now been discovered that improved yields of hydrogen peroxide are possible, and that the production of aldehydes may be suppressed if the partial oxidation of propane, n-butane or isobutane is caused to take place only in a temperature range which favors hydrogen peroxide formation over aldehyde formation. One means of carrying out the reaction so that such condition exists involves separately preheating the reactants to a temperature within the range favoring hydrogen peroxide formation and then mixing the preheated reactants so that the reaction occurs solely within that favorable temperature range. By operating in this manner, reaction at temperatures below the favorable range is avoided and as a result, hydrogen peroxide formation is increased whereas aldehyde formation is suppressed.

It has been discovered that when effecting the partial oxidation of propane, normal butane or isobutane, employing the hydrocarbon in a ratio of at least four volumes per one volume of oxygen, at temperatures below a certain temperature level, which level will depend upon the particular hydrocarbon being oxidized, aldehyde formation greatly exceeds hydrogen peroxide formation. However, at higher temperatures the reverse has been found to be true, i. e. peroxide formation predominates over aldehyde formation.

Figure I presents diagrams which show clearly the existence of a lower temperature range favoring the formation of aldehydes and a higher temperature range favoring formation of hydrogen peroxide in the partial oxidation of isobutane. In curve A the per cent of oxygen in the gaseous reaction mixture which has been reacted is plotted as a function of the reaction temperature. In curves B and C, the vapor concentrations in volume per cent of hydrogen peroxide and formaldehyde, respectively, in the product gases are plotted as functions of the reaction temperature. All aldehydes formed were regarded as formaldehyde because aldehydes other than formaldehyde were formed in relatively insignificant quantities. The reaction mixture employed for the experiments corresponding to the data plotted in the curves consisted of 95 parts of isobutane and 5 parts of oxygen by volume and the gas mixture in each experiment was passed through the reaction zone at a space velocity of 300 per hour measured at normal temperature and pressure. In all cases, the isobutane and oxygen were separately preheated to the various temperatures indicated in the curves before being mixed. In Figure II similar curves are shown for experiments carried out employing a gas mixture consisting of 95 parts of normal butane and 5 parts of oxygen by volume. The mixture was formed by mixing separately preheated streams of butane and oxygen and was passed through the reaction zone at a space velocity of 1620. In curve A of Figure II the per cent of oxygen reacted is plotted as a function of the reaction temperature, whereas in curves B and C, the vapor concentrations in volume per cent in the product gases of hydrogen peroxide and formaldehyde, respectively, are plotted as functions of the reaction temperature. Here again, all aldehydes formed were regarded as formaldehyde.

It will be seen from Figure I that at temperatures where the total reaction coefficient is negative, e. g., in the temperature range 360 to 380° C., the aldehyde concentration in the product gases decreases rapidly from a value of roughly 1.75% to about 0.8%, while the hydrogen peroxide concentration increases from a value of slightly over 1.0% to approximately 1.4%. As the reaction temperature coefficient becomes positive with increasing temperatures, the concentration of aldehydes in the product gases decreases still further, while the concentration of hydrogen peroxide continues to increase, reaching a maximum of about 1.7% at a temperature of about 415° C. Similarly, in Figure II at temperatures below about 400° C. the concentration of aldehydes in the product gases far exceeds the concentration of hydrogen peroxide.

However, if the reaction temperature is increased to above about 430° C. the total reaction coefficient becomes positive as indicated by curve A, and the amount of aldehydes produced as measured by the aldehyde concentration in the product gases becomes substantially lower than the hydrogen peroxide produced. Accordingly, in carrying out the process of the present invention, temperatures below those at which the hydrogen peroxide production exceeds aldehyde production are avoided and the entire reaction between the reactant gases is effected in that temperature range which is most favorable to the formation of hydrogen peroxide and least favorable to aldehyde formation.

The preferred way of carrying out the process so as to avoid the occurrence of reaction at temperatures below those favoring hydrogen peroxide formation is to pre-heat separately the reactant gases to a temperature within the favorable reaction range and then mix the pre-heated gases so that reaction occurs substantially completely within that temperature range. Other ways of accomplishing the same purpose may be employed. For example, sufficient hot combustion gases may be injected into a mixture of the reactant gases so that the temperature of the reactant gases is raised instantly to a value within the most favorable range. However, it is preferred that the avoidance of reaction at the undesired lower temperatures be accomplished by pre-heating separately the reaction gases and then mixing them at a temperature within the favorable range as previously indicated.

The reaction should be carried out employing at least 4 volumes of hydrocarbon vapor for each volume of oxygen. Much larger proportions of the hydrocarbon vapor, e. g. as high as 50 volumes per volume of oxygen, may be used successfully, although the employment of 9 to 19 volumes thereof per volume of oxygen is preferred. Best results are also obtained when the mixture of reactant gases is passed through the reaction zone at such a rate that the reaction is terminated when not more than 90%, preferably 80 to 90%, of the oxygen employed has been reacted. If the reaction is permitted to proceed beyond that point, the formation of hydrogen peroxide decreases, probably due to decomposition or to reactions involving the hydrogen peroxide and other constituents of the product gas mixture.

The net yield of hydrogen peroxide based upon the actual amount of oxygen reacted appears to depend more upon the fraction of the total oxygen that is reacted than upon the amount of oxygen initially present. The net yield of hydrogen peroxide in general increases as the percentage of oxygen reacted is decreased and net yields of hydrogen peroxide exceeding 80% of theory may be obtained when not more than 80 to 90% of the oxygen present in the reaction mixture is allowed to react. As the oxygen concentration in the gas mixture is increased, the volume concentration of hydrogen peroxide in the product gas is increased, but the gross yield and the ratio of hydrogen peroxide concentration to aldehyde concentration in the product gases are decreased. Accordingly, too high an oxygen concentration is undesirable and concentrations exceeding 20% of the total gas mixture should be avoided.

Diluents such as nitrogen and water vapor may be present during the reaction without harmful effect, however, excessive dilution of the reaction mixture by such diluents is not desirable. It is preferred that when such diluents are present, that they do not exceed about 60% of the total volume of gases. In other words the combined volume of the hydrocarbon and oxygen should be at least 40% of the total volume of the reaction mixture.

In specifying oxygen as one of the reactant gases, it is to be understood that the term "oxygen" is used to include pure oxygen and also oxygen-containing gases such as air which contain oxygen and an inert diluent.

As will be noted from the curves shown in Figures I and II, the reaction temperature range most favorable to hydrogen peroxide formation, varies somewhat depending upon the particular hydrocarbon employed. Thus, for isobutane, the favorable temperature range is about 370 to 460° C. and for normal butane, it is about 410 to 490° C. Accordingly, no fixed most favorable range may be stated which is applicable equally to each of the three saturated hydrocarbons which are used as raw materials in carrying out the present process. Furthermore, such a range may vary somewhat for any specific hydrocarbon depending upon such factors as the ratio of hydrocarbon to oxygen employed, the amount, if any, of diluent present and the residence time of the reactant gases in the reaction zone.

The product gases should be cooled as rapidly as possible so as to minimize side reactions involving hydrogen peroxide and to reduce hydrogen peroxide decomposition. Such cooling may be effected in a number of ways and may involve cooling in such a manner as to condense out all of the oxygenated products of the reaction, or it may be effected so as to produce a partial condensation effect, whereby hydrogen peroxide may be selectively condensed from the product gases to give an aqueous solution in which hydrogen peroxide predominates. Thus, by passing the product gases through a condenser maintained at a temperature of about 40° C., an aqueous solution is obtained which contains largely hydrogen peroxide with smaller amounts of oxygenated organic products such as aldehydes. Partial separation of the hydrogen peroxide may also be accomplished by fractional extraction methods employing solvents such as water. Thus, the product gases may be scrubbed with water at, for example, room temperature to remove around 90% of the hydrogen peroxide, along with smaller amounts of the aldehydes. Such crude solutions may be further purified by fractional distillation to recover relatively pure aqueous solutions of hydrogen peroxide. If total condensation of oxygenated products is practiced, the hydrogen peroxide may be separated from the condensate by fractional distillation, or by extraction or other well known procedures.

Instead of recovering the hydrogen peroxide in pure form, crude product rich in hydrogen peroxide may be separated from the product gases and utilized as a source of hydrogen peroxide to produce peroxygen compounds such as sodium perborate, zinc peroxide, and strontium peroxide according to known methods for producing such compounds.

After separation of reaction products as described above from the product gases, the residual gases may be treated to remove unsaturated hydrocarbons therefrom, and the remaining propane or butane may be recycled through the reaction zone after being fortified with make-up hydrocarbons and preheated in the manner described above. It has been found that the presence of any substantial quantity of unsaturated hydrocarbons such as propene or butene in the reaction mixture has a distinctly harmful effect upon the desired reaction. Quantities of unsaturated hydrocarbons exceeding about 2% of the volume of the reaction mixture are distinctly harmful and should be avoided. Accordingly, when recycling unreacted hydrocarbon, the hydrocarbon should be treated so as to remove substantially completely unsaturated hydrocarbons which are formed simultaneously with the formation of hydrogen peroxide in the reaction before carrying out such recirculation. Removal of unsaturates may be accomplished by any of the well known methods such as by absorption in sulphuric acid, by hydrogenation to saturated compounds or by polymerization procedures whereby higher boiling compounds are produced which may be removed by distillation methods. Instead of recirculating unreacted products, they may also be disposed of economically by employing the residual gaseous mixture after separating oxygenated reaction products as a fuel.

The effectiveness of separately pre-heating the reactants before causing them to react with each other by mixing them together at a temperature which favors hydrogen peroxide formation over aldehyde formation is shown by the following example:

*Example*

Propane and oxygen were passed at rates of 2850 cc. and 150 cc. per minute, respectively through a glass reaction tube 35 mm. in diameter and 8 inches long so that mixing of the gases occurred in the forepart of the tube. The reaction tube was heated externally by a surrounding furnace so as to maintain a temperature in the center of the tube of 480 to 485° C. The propane and oxygen were separately preheated to the above temperature prior to being mixed. Product gases from the reaction tube were passed immediately through a series of cold water scrubbers to remove therefrom oxygenated reaction products and the gases from the scrubbers were metered and the oxygen content thereof determined by analysis. It was found that 70% of the oxygen fed had been consumed in the reaction. The hydrogen peroxide and aldehyde, calculated as formaldehyde, recovered in the scrubbers correspond to concentrations of 1.52% and 0.54%, respectively, by volume in the product gases, the ratio of hydrogen peroxide concentration to aldehyde concentration being 2.82. The yields of hydrogen peroxide based upon oxygen fed and oxygen consumed were 30.4% and 43.4%, respectively.

In a comparison run, a reaction tube 35 mm. by 24 inches long was used and a mixture consisting of 95% propane and 5% oxygen was passed through the tube at a rate of about 3000 cc. per minute. The two gases were mixed at room temperature before being passed into the tube. A longer reaction tube was employed in this run because the forepart of the tube had to serve as a preheater for the gas mixture. The temperature in that part of the tube where the main reaction occurred was maintained at 472 to 480° C. The oxygen consumption in this run was 85.5% and the recoveries of hydrogen peroxide and aldehyde, calculated as formaldehyde, in the scrubbers, corresponded to concentrations of 0.8% and 1.62%, respectively, by volume in the product gases. The ratio of hydrogen peroxide concentration to aldehyde concentration was 0.49 and the yields of hydrogen peroxide based upon oxygen fed and oxygen consumed were 16% and 18.7%, respectively.

One of the most practical ways of utilizing hydrogen peroxide obtained from the above type oxidation process is to employ the crude hydrogen peroxide solution recovered in the scrubbers as the source of active oxygen in preparing other peroxygen compounds such as sodium perborate, zinc peroxide, barium peroxide, calcium peroxide, strontium peroxide and the like. However, the value of such crude solution for such use depends largely upon the relative proportions of hydrogen peroxide and aldehydes present in the solutions and if the relative concentration of aldehyde is too high, it becomes practically impossible to recover the active oxygen in worthwhile yields in the form of, for example, sodium perborate. Thus, I have found that when such crude solutions contain two mols of formaldehyde per mol of hydrogen peroxide with the concentration of the latter being about 7 to 10% by weight, no sodium perborate could be precipitated when the crude solution was treated with a solution containing sodium metaborate in an amount stoichiometrically equivalent to the hydrogen peroxide in the crude solution. When the mol ratio of hydrogen peroxide to aldehyde in the crude product is 1, about 35% of the active oxygen is recoverable as sodium perborate. As the hydrogen peroxide to aldehyde ratio increases, the active oxygen recoverable as sodium perborate also increases; thus, for ratios of 3 and 4 recoveries of about 68% and 75%, respectively, are possible. Accordingly, when recovery as perborate is desired, it is important that the oxidation of the hydrocarbon be carried out under conditions which favor hydrogen peroxide formation and suppress aldehyde formation.

The active oxygen in the crude hydrogen peroxide solutions obtained by scrubbing the product gases with water may be recovered more readily and in better yields as calcium or strontium peroxide than as sodium perborate. Thus, by reacting the crude hydrogen peroxide solution with an equivalent amount of a calcium chloride solution, followed by the slow addition of sodium or ammonium hydroxide in equivalent amounts at 4 to 7° C., followed by drying the precipitated product, good yields of calcium peroxide are obtained. However, substantially better yields are obtained when the crude hydrogen peroxide solution is relatively free of aldehydes. With a crude solution containing equimolar concentrations of hydrogen peroxide and aldehyde, recoveries of about 75 to 80% are possible. By reacting the crude solution with strontium nitrate in place of calcium chloride, strontium peroxide may be obtained in yields corresponding to the yields of calcium peroxide. Barium peroxide and zinc peroxide may similarly be prepared using the above crude hydrogen peroxide solution by methods well known. In all such preparations, the yields of the metal peroxide are higher the higher the ratio of hydrogen peroxide concentration to aldehyde concentration in the crude hydrogen peroxide solution.

The reaction should be carried out under non-catalytic conditions, and therefore, it is necessary that the reaction vessel be constructed of materials which do not catalyze the reaction or the decomposition of hydrogen peroxide. Materials such as copper, iron and the like should be avoided. When carrying out the reaction on a small scale the reaction vessel may be conveniently constructed of glass, fused silica or similar materials and before use the reaction vessel is preferably thoroughly cleaned by means of nitric acid or hydrofluoric acid. In larger scale operations the particular material used to construct the reaction vessel is not so important since the ratio of the volume of the reactor to reactor surface is lower than in smaller scale equipment. Such larger scale equipment may be constructed of materials such as Monel metal or non-corrosive chrome-nickel alloys. Such construction materials may be used effectively, particularly if the walls of the reaction vessel are cooled substantially below the temperature in the reacting body of gases.

Since various changes in the details and illustrations set forth above may be made without departing from the spirit and scope of the invention, it is to be understood that the invention is not to be limited to such details, except as indicated in the appended claims.

I claim:

1. In a process for the production of hydrogen peroxide by the vapor phase, non-catalytic reaction of a hydrocarbon selected from the group consisting of propane, n-butane and isobutane with oxygen in a ratio of at least four volumes of said hydrocarbon per volume of oxygen at a temperature within the range in which hydrogen peroxide formation predominates over aldehyde formation, the steps comprising heating said reactants separately to a temperature within said range and then mixing them in a reaction zone so as to effect said reaction at a temperature within said range, and withdrawing product gases from said reaction zone when not more than 90% of the oxygen has reacted.

2. In a process for the production of hydrogen peroxide by the vapor phase, non-catalytic reaction of a hydrocarbon selected from the group consisting of propane, n-butane and isobutane with oxygen, the steps comprising separately heating said reactants to a temperature within the range in which hydrogen peroxide formation predominates over aldehyde formation, and continuously mixing together separate streams of said heated reactants in a ratio of at least four volumes of said hydrocarbon per volume of oxygen in a reaction zone maintained at a temperature within said range and continuously withdrawing product gases from said reaction zone when not more than 90% of said oxygen has reacted.

3. In a process for the production of hydrogen peroxide by the vapor phase, non-catalytic reaction of a hydrocarbon selected from the group consisting of propane, n-butane and isobutane with oxygen, the steps comprising heating separately said reactants to a temperature within the range in which hydrogen peroxide formation predominates over aldehyde formation, effecting said reaction by continuously mixing together separate streams of said heated reactants in a ratio of at least four volumes of said hydrocarbon per volume of oxygen in a reaction zone maintained at a temperature within said range and continuously withdrawing product gases from said reaction zone when not more than 90% of said oxygen has reacted, said hydrocarbon and oxygen constituting at least 40% by volume of the total volume of gases passed into said reaction zone.

4. In a process for the production of hydrogen peroxide by the vapor phase, non-catalytic reaction of a hydrocarbon selected from the group consisting of propane, n-butane and isobutane with oxygen, the steps comprising heating separately said reactants to a temperature within the range in which hydrogen peroxide formation predominates over aldehyde formation, continuously mixing together separate streams of said heated reactants in a ratio of 9 to 19 volumes of said hydrocarbon per volume of oxygen in a reaction zone maintained at a temperature within said range, withdrawing product gases from said reaction zone when not more than 90% of said oxygen has reacted and recovering therefrom hydrogen peroxide.

5. In a process for the production of hydrogen peroxide by the vapor phase, non-catalytic reaction of n-butane with oxygen, the steps comprising separately heating said reactants to a temperature within the range 410 to 490° C., mixing said heated gases in a reaction zone maintained at a temperature within said range employing 4 to 50 volumes of butane per volume of oxygen, withdrawing product gases from said reaction zone when not more than 90% of said oxygen has reacted and recovering hydrogen peroxide therefrom.

6. The process of claim 5 employing 9 to 19 volumes of butane per volume of oxygen.

7. In a process for the production of hydrogen peroxide by the vapor phase, non-catalytic reaction of isobutane with oxygen, the steps comprising separately heating said reactants to a temperature within the range 370 to 460° C., mixing said heated gases in a reaction zone maintained at a temperature within said range employing 4 to 50 volumes of isobutane per volume of oxygen, withdrawing product gases from said reaction zone when not more than 90% of said oxygen has reacted and recovering hydrogen peroxide therefrom.

8. The process of claim 7 employing 9 to 19 volumes of isobutane per volume of oxygen.

9. In a process for the production of hydrogen peroxide by the vapor phase, non-catalytic reaction of propane with oxygen, the steps comprising separately heating said reactants to a temperature within the range 480 to 485° C., mixing said heated gases in a reaction zone maintained at a temperature within said range employing 4 to 50 volumes of propane per volume of oxygen, withdrawing product gases from said reaction zone when not more than 90% of said oxygen has reacted and recovering hydrogen peroxide therefrom.

10. The process of claim 9 employing 9 to 19 volumes of propane per volume of oxygen.

CHARLES R. HARRIS.

REFERENCES CITED

The following references are of record in the file of this patent:

UNITED STATES PATENTS

| Number | Name | Date |
|---|---|---|
| 1,392,886 | Bibb | Oct. 4, 1921 |
| 1,978,621 | Burke | Oct. 30, 1934 |
| 1,991,344 | Burke | Feb. 12, 1935 |
| 2,007,116 | Walker | July 2, 1935 |
| 2,018,994 | Burke | Oct. 29, 1935 |
| 2,186,688 | Walker | June 9, 1940 |
| 2,376,257 | Lacomble | May 15, 1945 |

OTHER REFERENCES

Journal of the American Chemical Society, vol. 51, pages 1836-1856 (1929), and vol. 56, pages 2034-2038 (1934).